United States Patent
Komiya et al.

(10) Patent No.: US 6,573,451 B2
(45) Date of Patent: Jun. 3, 2003

(54) PROTECTIVE GUIDE FOR CABLES AND THE LIKE

(75) Inventors: Shoichiro Komiya, Osaka (JP); Takayuki Matsuda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/225,591

(22) Filed: Aug. 22, 2002

(65) Prior Publication Data

US 2003/0042040 A1 Mar. 6, 2003

(30) Foreign Application Priority Data

Sep. 6, 2001 (JP) ..................... 2001-270684

(51) Int. Cl.⁷ ............................... H01B 1/00
(52) U.S. Cl. ............... 174/68.1; 174/72 A; 174/69
(58) Field of Search .............. 174/72 A, 68.1, 174/111, 101; 59/78.1

(56) References Cited

U.S. PATENT DOCUMENTS

| | | | | |
|---|---|---|---|---|
| 3,330,105 A | * | 7/1967 | Weber ..................... | 59/78.1 |
| 3,546,875 A | * | 12/1970 | Weber ..................... | 59/78.1 |
| 4,228,825 A | * | 10/1980 | Moritz et al. .............. | 138/120 |
| 4,373,324 A | * | 2/1983 | Janos ..................... | 59/78.1 |
| 4,392,344 A | * | 7/1983 | Gordon et al. ............. | 59/78.1 |
| 4,420,017 A | * | 12/1983 | Moritz .................... | 135/120.1 |
| 4,658,577 A | * | 4/1987 | Klein ..................... | 59/78.1 |
| 5,254,809 A | * | 10/1993 | Martin .................... | 174/68.1 |
| 6,107,565 A | * | 8/2000 | O'Rourke ................. | 174/21 JS |
| 6,161,373 A | * | 12/2000 | Heidrich et al. ............ | 59/78.1 |
| 6,374,589 B1 | * | 4/2002 | Kunert et al. .............. | 59/78.1 |
| 6,448,498 B1 | * | 9/2002 | King et al. ............... | 174/99 R |

FOREIGN PATENT DOCUMENTS

| | | |
|---|---|---|
| JP | 62-15008 | 4/1987 |
| JP | 10028310 | 1/1998 |

* cited by examiner

*Primary Examiner*—Dean A. Reichard
*Assistant Examiner*—Jinhee Lee
(74) *Attorney, Agent, or Firm*—Woodling, Krost & Rust

(57) ABSTRACT

A protective guide for cables and the like, in which a synthetic flexible tube 10 connected between a movable end portion 10a of the cable and a fixed end portion 10b of the cable and incorporating a plurality of cables and the like includes a bellows-shaped tubular peripheral wall 11, and a large number of bending-limiting units 20 surrounding by and fitted onto the bellows-shaped tubular peripheral wall 11 of said synthetic flexible tube 10 at desired intervals includes bending-holding portions 20a, which hold a required bending position of said synthetic flexible tube 10 while abutting with each other on a bending inner peripheral side, and bending-suppressing portions 10, which hold a linearly extended position of said synthetic flexible tube 10 while abutting with each other on a bending outer peripheral side.

18 Claims, 9 Drawing Sheets

(a)

(b)

(a)

(b)

PROTECTIVE GUIDE FOR CABLES AND THE LIKE

This patent application includes a claim of foreign priority to prior filed Japanese Patent Application 2001-270684 filed Sep. 6, 2001.

TECHNICAL FIELD TO WHICH THE INVENTION PERTAINS

The present invention relates to a protective guide used for machine tools, electric equipments, industrial robots, transportation machines and the like, for safely and reliably protecting and guiding flexible cables and the like such as electric wire cables, optical fiber cables, liquid supply hoses and the like.

RELATED ART

When an electric wire cable or a hydraulic or pneumatic pressure hose is connected to a machine tool, an earthmover, or a moving equipment such as a transportation equipment and the like, undue torsion or tension is generated in the cable or hose during movement so that the cable or hose is damaged and an outward appearance becomes irregular. Thus, various protective guides for supporting and guiding these cables or hoses have been provided.

A movable guide equipment for cables or the like proposed in, for example, Japanese Patent Laid-Open Publication No. Hei. 10-28310 is one integrally molded as a whole and made of plastics as described in the publication (the reference numerals of the members are the same as in the publication below). In the movable guide equipment, at least one row of protruded pieces (8) is integrally molded on a bottom surface of a bottom wall (2) in an accommodation member (1), which receives the cables or the like, the protruded pieces divided at a bend portion R in the accommodation member (1) are brought into contact with each other so that a fixed bend position can be, and a lid piece (11) is integrally molded on an upper end portion of one side wall piece (3) in the accommodation member (1) so as to be openable and the lid piece is detachably provided on the other side wall piece (3).

Further, in an energy conductor holding device proposed in Japanese Examined Patent Publication No. Sho. 62-15008, a plastic small diameter tube member is disposed inside, a fan-shaped groove is provided in an up and down direction on an outer peripheral surface of the side portion, half bodies of a tubular member of a metallic plate are provided on upper and lower portions on the outside and the half bodies of the tubular member are attached by engaging them with a pin so that the small diameter member is sandwiched by the half bodies from the up and down directions. Thus, the energy conductor holding device includes so called a connection link structure, in which a connection of the holding device in a longitudinal direction is performed by the engagement between the groove of the inside small diameter tube member and the upper and lower tubular member half bodies.

PROBLEMS TO BE SOLVED BY THE INVENTION

The movable guide equipment for the cables and the like in the former publication Japanese Patent Laid-Open Publication No. Hei. 10-28310 is integrally molded as a whole and made of plastics having flexibility. Thus, when a large load is acted on the bend portion of the equipment from above, the movable guide equipment is buckled so that a correct bending radius cannot be maintained. Further, since the movable guide equipment is made of flexible material it is liable to flex and cannot receive or support a heavier object to be supported. Thus, when weight is applied on one side of the equipment, the movable guide equipment becomes unstable and is twisted. If a straight portion of the equipment is long, there was a problem that flexure is large so that a bend portion of the equipment can fall down due to the shortage of rigidity.

Further, in the energy conductor holding device of the latter publication half bodies of the upper and lower tubular members are produced by the use of a metallic material and a small diameter member is molded of synthetic resin. Thus, the metallic material shaves the synthetic resin material during the sliding of the half bodies of the upper and lower tubular members and the small diameter member, to produce much worn powder. Further, since the equipment also uses a metallic material it becomes heavier as compared with equipment molded of only synthetic resin and additionally, since a metallic material portion and a synthetic resin portion are collided with each other during the movement of a supporting device, a large noise is generated. Further, since the half bodies of the most peripheral upper and lower tubular members are made of metal there was a problem that noise generated when the upper frame hits a floor surface during their movement is large.

Problems to be solved. To provide a protective guide for cables and the like, which can prevent undue bending or running off of the cable and the like whereby it can be reliably received and protected, and at the same time which can attain smooth movement guide of the cable and the like by suppressing contact worn powder, which is liable to be produced by bending and torsion, and further, whose assembling and maintenance is simple and whose noise is small and which is lightweight and is inexpensive.

Accordingly, an object of the present invention is to solve the above-mentioned prior art problems and to provide a protective guide for cables and the like, which can prevent undue bending or running off of the cable and the like whereby it can be reliably received and protected, and at the same time which can attain smooth movement guide of the cable and the like by suppressing contact worn powder, which is liable to be produced by bending and torsion, and further, whose assembling and maintenance are simple and whose noise is small and which is lightweight and is inexpensive.

MEANS TO SOLVE THE PROBLEMS

To solve the above-mentioned problems in a protective guide for cables and the like, which is an invention of claim 1, a flexible tube connected between a movable end portion of the cable and a fixed end portion of the cable and incorporating cables and the like includes a bellows-shaped tubular peripheral wall, and a large number of bending-limiting units surrounded by and fitted onto the bellows-shaped tubular peripheral wall of said flexible tube at desired intervals includes bending-holding portions, which hold a required bending position of said flexible tube while abutting with each other on a bending inner peripheral side, and bending-suppressing portions, which hold a linearly extended position of said flexible tube while abutting with each other on a bending outer peripheral side.

In a protective guide for cables and the like, which is the invention of claim 2, in addition to the configuration of claim 1, said flexible tube and said bending-limiting units are formed of resin thereby to solve said problems.

In a protective guide for cables and the like, which is the invention of claim 3, in addition to the configuration of claim 1 or 2, the bellows-shaped tubular peripheral wall of said flexible tube includes fine bellows portions formed on said bending inner peripheral side and rough bellows portions formed on said bending outer peripheral side thereby to solve said problems.

In a protective guide for cables and the like, which is the invention of claims 4 or 6, in addition to the configuration of any one of claims 1 to 3, each of said bending-limiting unit has a frame structure of a rectangular section thereby to further solve the problems.

In a protective guide for cables and the like, which is the invention of claims 5, 7 and 8 in addition to the configuration of claims 1 to 4, said bending-limiting unit is formed by detachably engaging an attachment disposed on the bending inner peripheral side of said flexible tube and a clip disposed on the bending outer peripheral side of said flexible tube thereby to further solve the problems.

If the flexible tube including a bellows-shaped tubular peripheral wall used in the present invention has a shape that can be appropriately bend while incorporating cables and the like it may have any shape such as a circular section, an oval section, a rectangular section or the like.

If a position of forming the bending holding portion in said bending-limiting unit is one where the adjacent bending holding portions are sequentially abutted with each other in a plane of a bend portion in said flexible tube and can maintain a required bend position of said flexible tube, any position on the bend inner peripheral side may be used. Further, if a position of forming the bend suppressing portion of said bending-limiting unit is one where the adjacent bending holding portions are sequentially abutted with each other in a plane of a bend portion in said flexible tube and can maintain a linearly extended position of said flexible tube, any position on the bend outer peripheral side may be used.

Action

When cables and the like, which perform power supply, liquid supply or the like to moving machines such as machine tools, electric devices, industrial robots, transportation machines or the like or to a moving portion in a machine, are moved together with the moving portion of the machine, the protective guide of the cables and the like, which are the present invention, sequentially displace a portion where a flexible tube shows a required bend position in accordance with the movement position of a movable end portion of the cable while ensuring a required bending radius which is formed by mutually adjoining the bending holding positions of a large number of fitted bending-limiting units surrounded by the flexible tube. Further, bending suppressing portions in the large number of bending-limiting units, which were surrounded by and fitted onto the rest of said flexible tube are mutually adjoined with each other and protect collected cables and the like while keeping a linearly extended position.

The invention will be better understood when reference is made to the BRIEF DESCRIPTION OF THE DRAWINGS, DETAILED DESCRIPTION OF THE INVENTION, and CLAIMS which follow hereinbelow.

A better understanding of the invention will be had when reference is made to the DETAILED DESCRIPTION OF THE INVENTION and CLAIMS which follow hereinbelow.

DETAILED DESCRIPTION OF THE INVENTION

Working Example

First Example

Here, a first Example of a protective guide for cables and the like, which is preferable as the present invention (hereinafter referred to as a protective guide only) will be described with reference to FIGS. 1 to 6.

Figure 1:
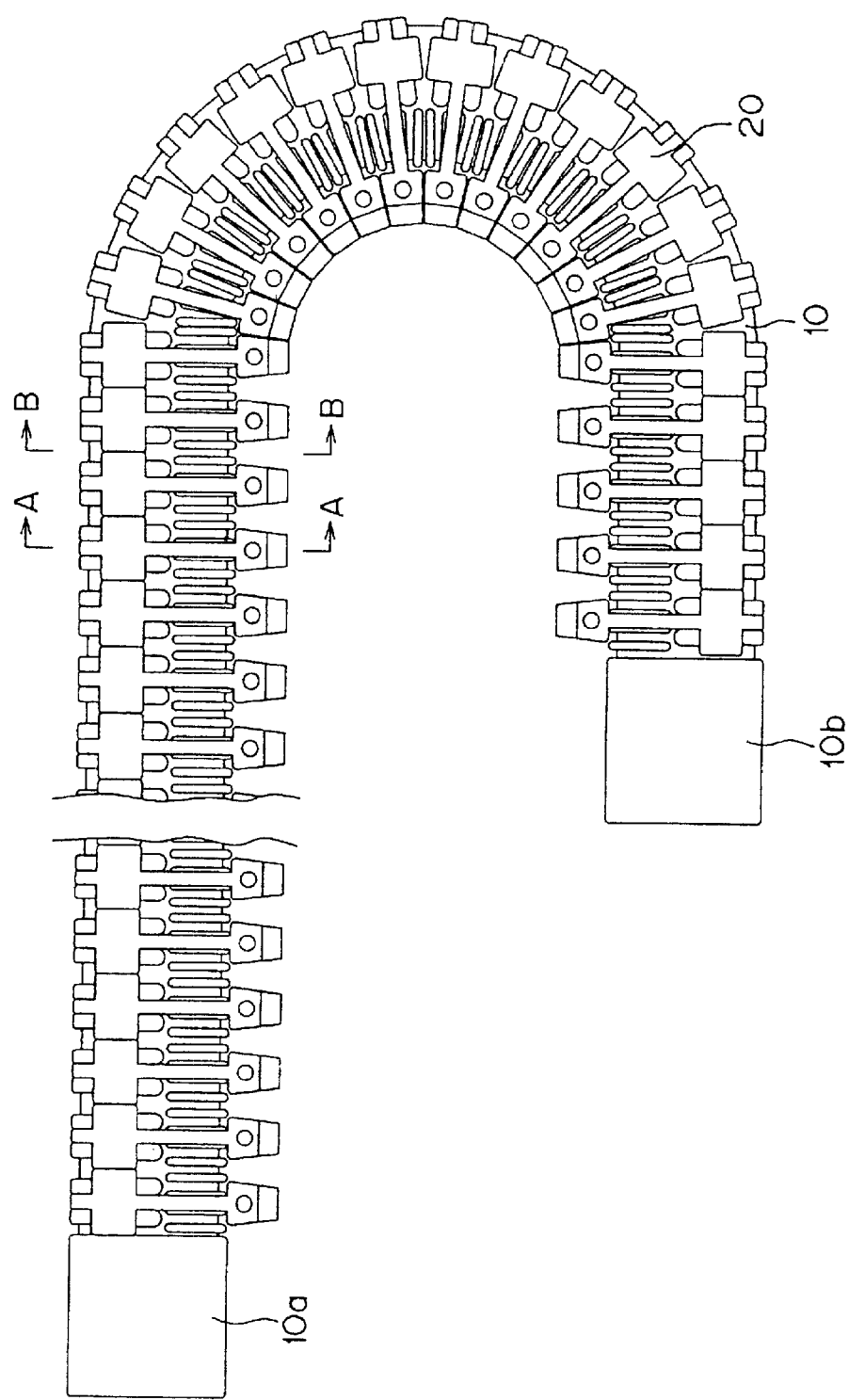
FIG. 1 is a view of an entire protective guide, which is a first Example of the present invention.
Figure 2:
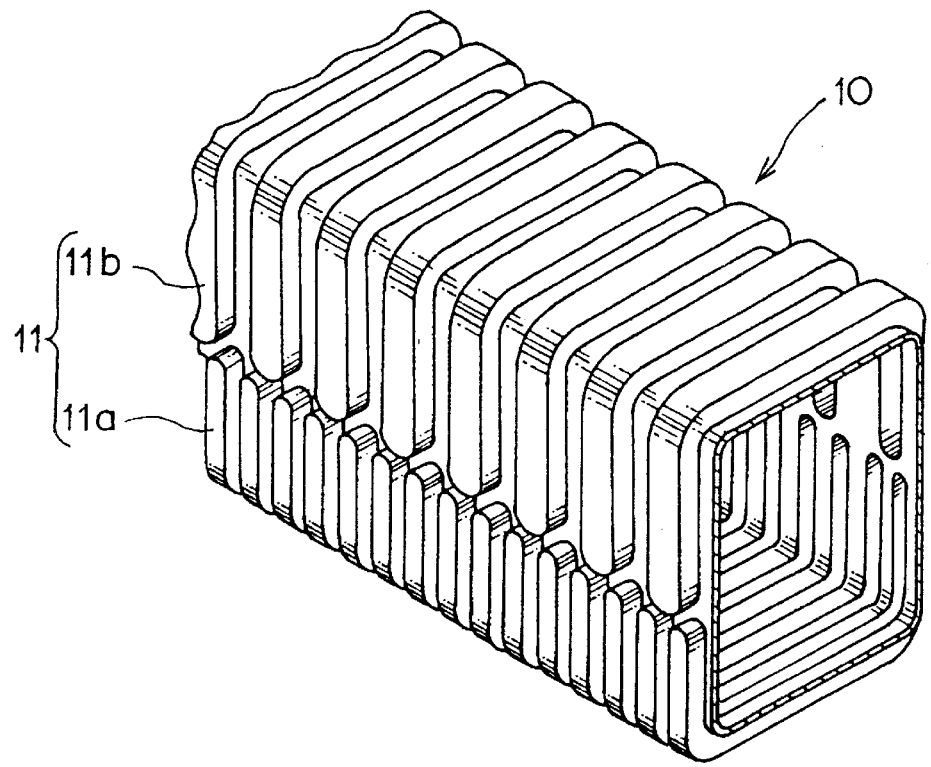
FIG. 2 is a perspective view of a flexible tube used in the present invention.
Figure 3:
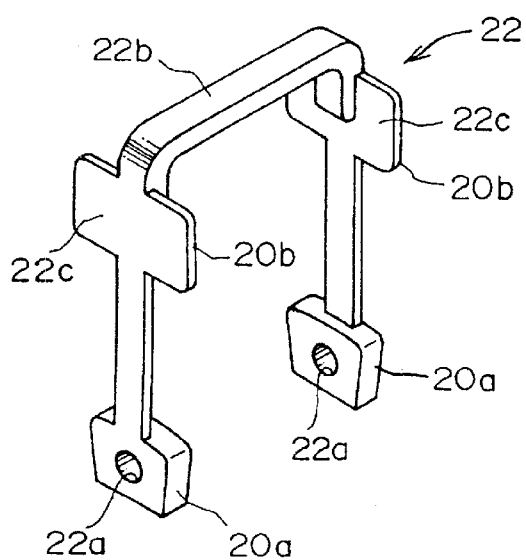
FIG. 3 is a view of a part of a bending-limiting unit used in the first Example of the present invention, particularly, (a) is a perspective view of a clip and (b) is a perspective view of an attachment.
Figure 3:
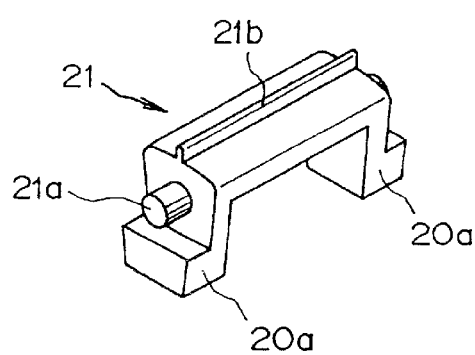
Figure 4:
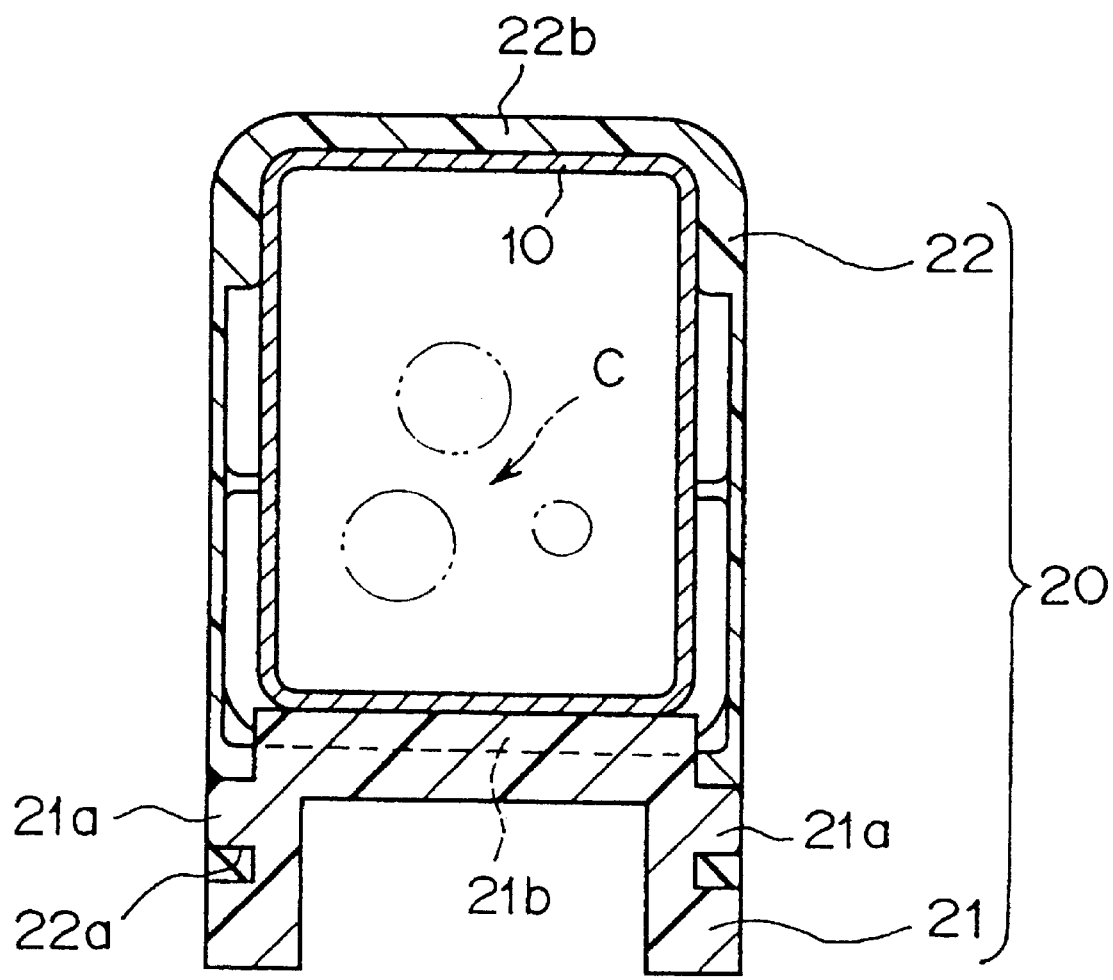
FIG. 4 is a cross-sectional view taken along line A—A of FIG. 1.
Figure 5:
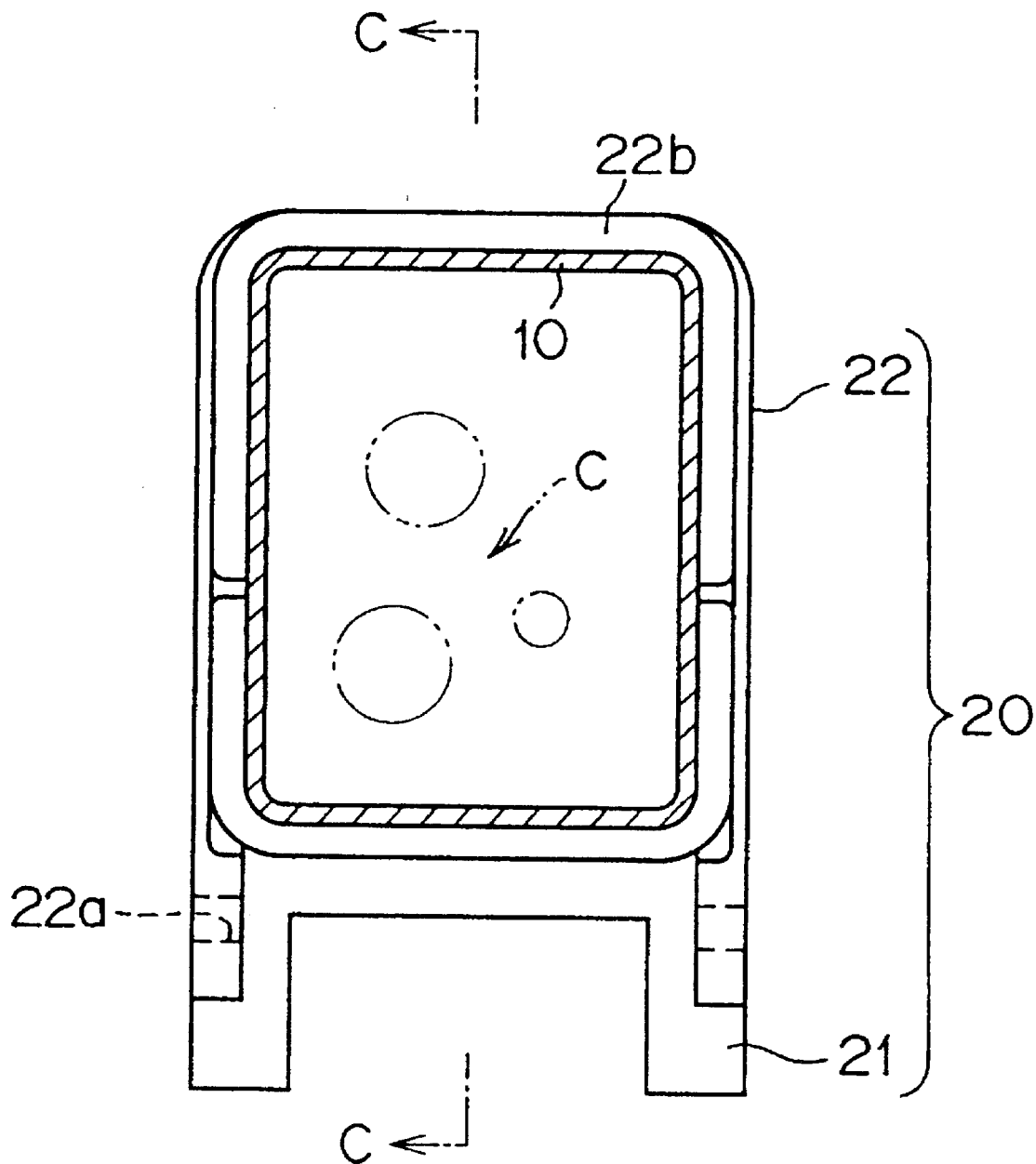
FIG. 5 is a cross-sectional view taken along line B—B of FIG. 1.
Figure 6:
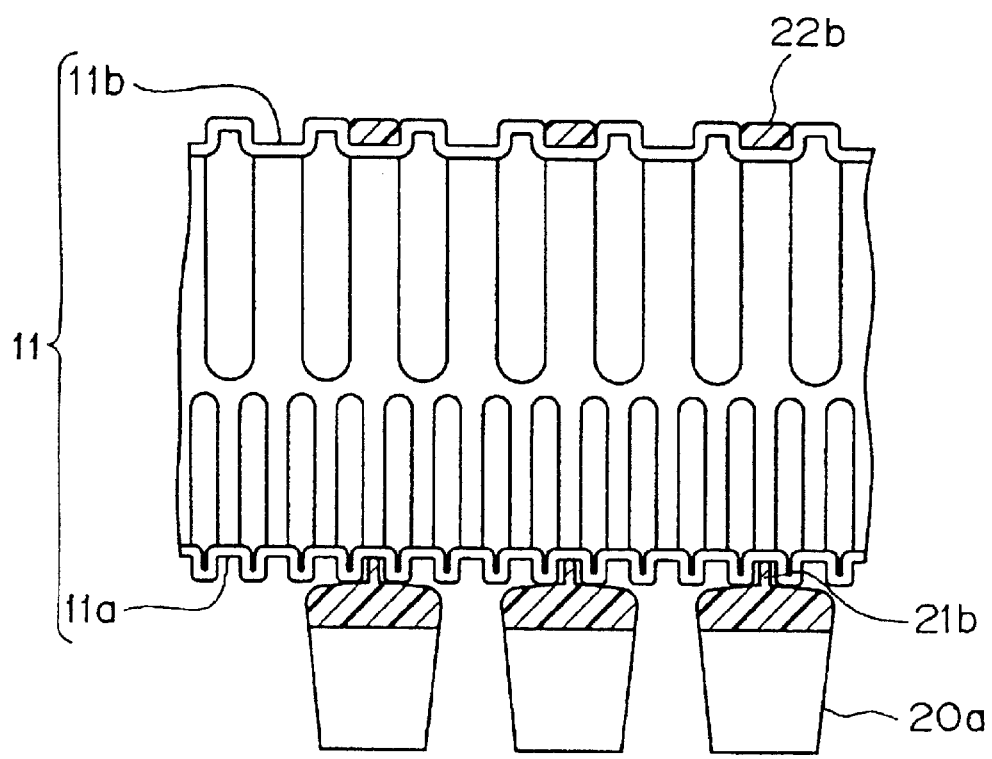
FIG. 6 is a cross-sectional view taken along line C—C of FIG. 5.

FIG. 1 shows a view of an entire protective guide, which is a first Example of the present invention, FIG. 2 is a perspective view of a flexible tube used in the present invention, and FIG. 3 is a view of a part of a bending-limiting unit used in the present Example. Further, FIG. 4 is a cross-sectional view taken along line A—A of FIG. 1, FIG. 5 is a cross-sectional view taken along line B—B of FIG. 1 and FIG. 6 is a cross-sectional view taken along line C—C of FIG. 5.

The protective guide of the present Example is used in a machine tool, an electric device, an industrial robot, a transportation machine and the like, and securely and reliably protect and guide flexible cables and the like such as electric wire cables, optical fiber cables, liquid supply hoses or the like, which perform power supply, liquid supply or the like to the above-mentioned machine or a movable portion of the machine by collecting them. The protective guide of the present Example comprises a synthetic resin flexible tube 10 connected between a movable end portion 10a of the cable and a fixed end portion 10b of the cable while incorporating a plurality of cables and the like and a large number of synthetic bending-limiting units 20 surrounded by and fitted onto this synthetic resin flexible tube 10 at required intervals to support the synthetic flexible tube 10 so that any one of a required bend position and an extended position thereof.

In said synthetic resin flexible tube 10, a bellows-shaped tubular peripheral wall 11 of a rectangular section comprising a thinner bellows-shaped portion 11a formed on a bend inner peripheral side and a thicker bellows-shaped portion 11b formed on a bend outer peripheral side, is formed as shown in FIG. 2. This bellows-shaped tubular peripheral wall 11 enables smooth bending motion to be attained and a large number of synthetic bending-limiting units 20 to be reliably and easily attached to each other at required intervals. It is noted that said bellows-shaped tubular peripheral wall 11 is formed in an uneven manner over the surface and back of the synthetic resin flexible tube 10 to attain more smooth bending motion.

On the other hand, said synthetic resin bending-limiting unit 20 comprises an attachment 21 disposed on a bend inner peripheral side of the synthetic resin flexible tube 10 and a clip 22 disposed on a bend outer peripheral side of the synthetic resin flexible tube 10, as shown in FIG. 3. Further, as shown in FIGS. 4 and 5, a locking pin 21a provided on said attachment 21 and a pin hole 22a provided in said clip 22 are detachably engaged with each other to form a hollow frame structure of a rectangular section.

Therefore, in the protective guide of the present Example, a bending holding portion 20a and a bending suppressing portion 20b can be disposed on the both sides of the synthetic resin bending-limiting unit 20 in various configurations so that strength and rigidity required for the protective guide are satisfied. Accordingly, a required bend position and a linearly extended position of the synthetic resin flexible tube 20 can be reliably formed, respectively, and these positions can be smoothly switched mutually without overlapping and restraining them.

The reference numeral 21b in FIG. 3 denotes a stopper piece, which projection/depression engages with a thinner bellows portion 11a formed on the bend inner peripheral side of said synthetic resin flexible tube 10 to prevent the shifting of the fitted position in a longitudinal direction of the guide, as shown in FIG. 6, and the reference numeral 22b in FIG. 3 denotes a rib piece, which projection/depression engages with a thicker bellows portion 11b formed on the bend outer peripheral side of said synthetic resin flexible tube 10 to prevent the shifting of the fitted position in a longitudinal direction of the guide, as shown in FIG. 6. Further, in the present Example, said attachment 21 is provided with the locking pin 21a, and said clip 22 is provided with the pin hole 22a. However, the attachment 21 may be provided with the pin hole and also the clip 22 may be provided with the locking pin.

Further, said synthetic resin flexible bending-limiting unit 20 includes a bending holding portion 20a, which holds a required bend position of said synthetic resin flexible tube 10 by contacting each other on the bending inner peripheral side and a bending suppressing portion 20b, which holds a linearly extended position of said synthetic resin flexible tube 10 by contacting each other on the bending outer peripheral side.

In the case of the present Example, the bending holding portion 20a, which holds the required bending position of said synthetic resin flexible tube 10 is formed by such a tapered contact surface as directs to the center of a required bending radius in an engagement portion between said attachment 21 and the clip 22 which engages with the attachment 21. The bending suppressing portion 20b, which holds the linearly extended position of said synthetic resin flexible tube 10 is formed by a rectangular contact piece 22c projected in an arrangement direction of said clip 22.

When cables and the like C are moved together with a movable portion (not shown) in a machine, the thus obtained protective guide of the first Example of the present invention sequentially displaces a portion, which shows a required bend position in the synthetic resin flexible tube 10 in accordance with a movement position of the movable end portion of the cable while ensuring a required bending radius formed by adjoining the bending holding portions 20a of a large number of synthetic resin bending-limiting units 20 surrounded by and fitted to the synthetic resin flexible tube 10, and guides the cables and the like together with the movable portion in said machine.

Then, the bending suppressing portions 20b of the large number of synthetic resin bending-limiting units 20, surrounded by and fitted onto the remaining portion in said synthetic resin flexible tube 10 are adjoined with each other to protect collected cables C and the like while maintaining the linearly extended position.

Therefore, in the protective guide of the first Example according to the present invention, said synthetic resin flexible tube 10 and said synthetic resin bending-limiting units 20 are molded of resin. Thus, weight reduction and cost reduction in the protective guide can be attained. Further, since a plurality of cables and the like are completely sealed in the synthetic resin flexible tube 10 so that the running off of the cables and the like are blocked and reliably accommodated and protected, discharge of dust and the like such as contact worn powder, which is likely to occur by bending or torsion of the cables and the like C, which can occur in the synthetic resin flexible tube 10, can be completely prevented. Additionally, the cables and the like within the synthetic resin flexible tube 10 can be bending-moved in an stable accommodation protective state without being influenced by polygonal movement of the synthetic resin bending-limiting units 20.

Since said synthetic resin bending-limiting units 20 are formed by detachably engaging the attachments 21 and the clips 22, the synthetic resin flexible tube 10 can be easily removed from the synthetic resin bending-limiting units 20 by releasing the engagement. As a result the disconnection and arrangement states or the like of the cables and the like can be maintained and checked. Further, by changing a shape of the bending holding portion 20a in the attachment 21 disposed on a bend inner peripheral side of the synthetic resin flexible tube 10, the bending radius of the synthetic resin flexible tube 10 can be optionally set in accordance with the layout of the protective guide.

Second Example

Figure 7:
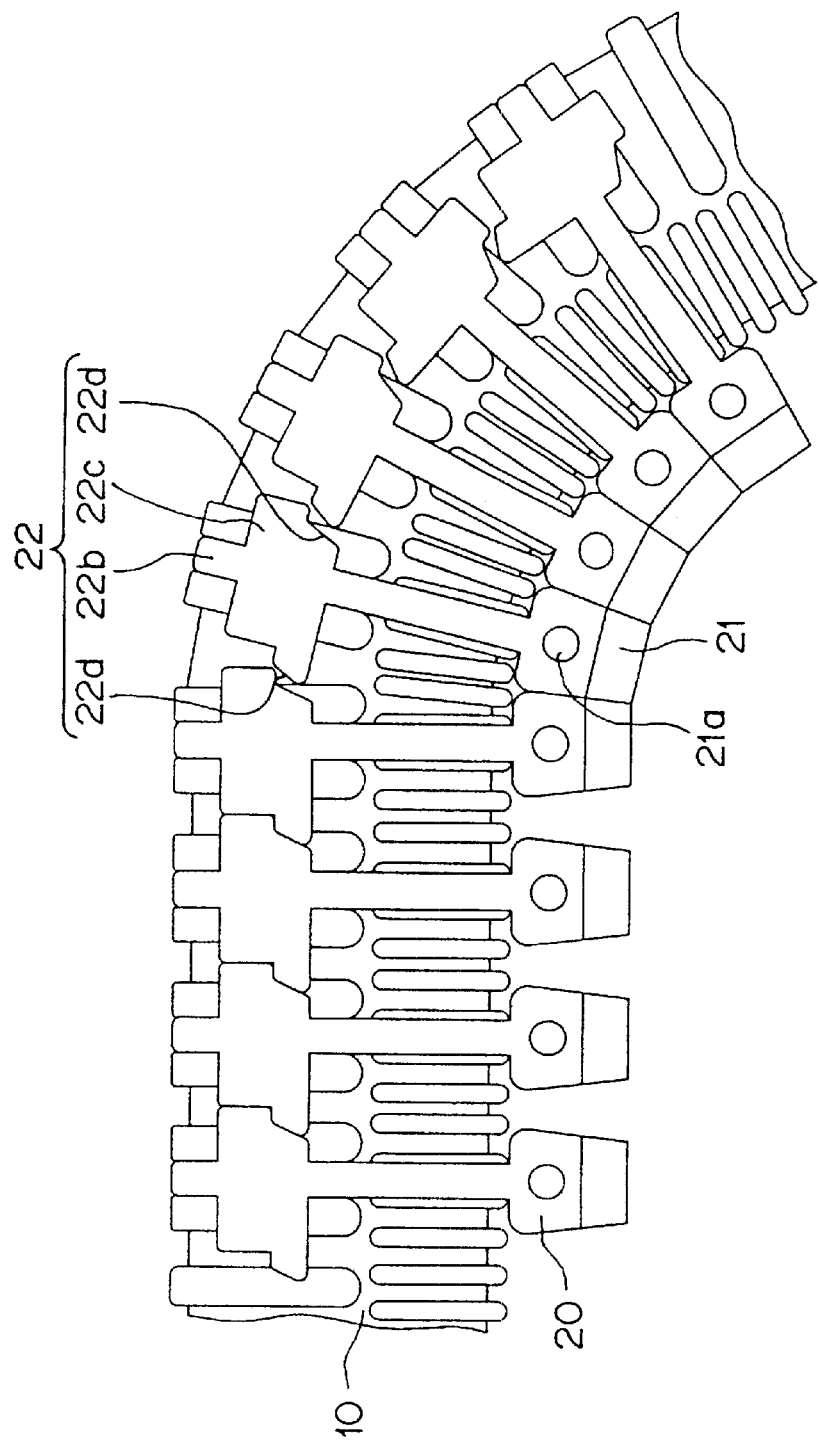
FIG. 7 is a partial view of a protective guide for cables and the like, which is the second Example of the present invention.

Next, a second Example of a protective guide, which is preferable as the present invention, will be described with reference to FIG. 7.

The protective guide, that is the second Example of the present invention includes a guide basic structure comprising a synthetic resin flexible tube 10 and synthetic resin bending-limiting units 20 as in the first Example but it is only different from the first Example in that a concrete shape of the clip 22 forming said synthetic resin bending-limiting units 20 is changed. Thus, the detailed description of concrete structures except for said clip 22 is omitted.

Thus, the concrete shape of the clip 22 in the second Example will be described in detail. In the second Example, a cam surface 22d is formed on front and rear ends of a rectangular contact piece 22 projected in the arrangement direction of the clip 22. In the cam surface 22d a required bend position and a linearly extended position of the synthetic resin flexible tube 20 are smoothly, sequentially switched.

The thus obtained protective guide of the second Example according to the present invention has the same actions and effects as in the protective guide of the first Example. However, in addition to that, in the second Example, the formation of the cam surface 22d enables a required bend position and a linearly extended position of the synthetic resin flexible tube 20 to be smoothly, sequentially switched and reduces the impact between the adjacent clips 22, which is likely occur during the switching of their position.

Third Example

Figure 8:
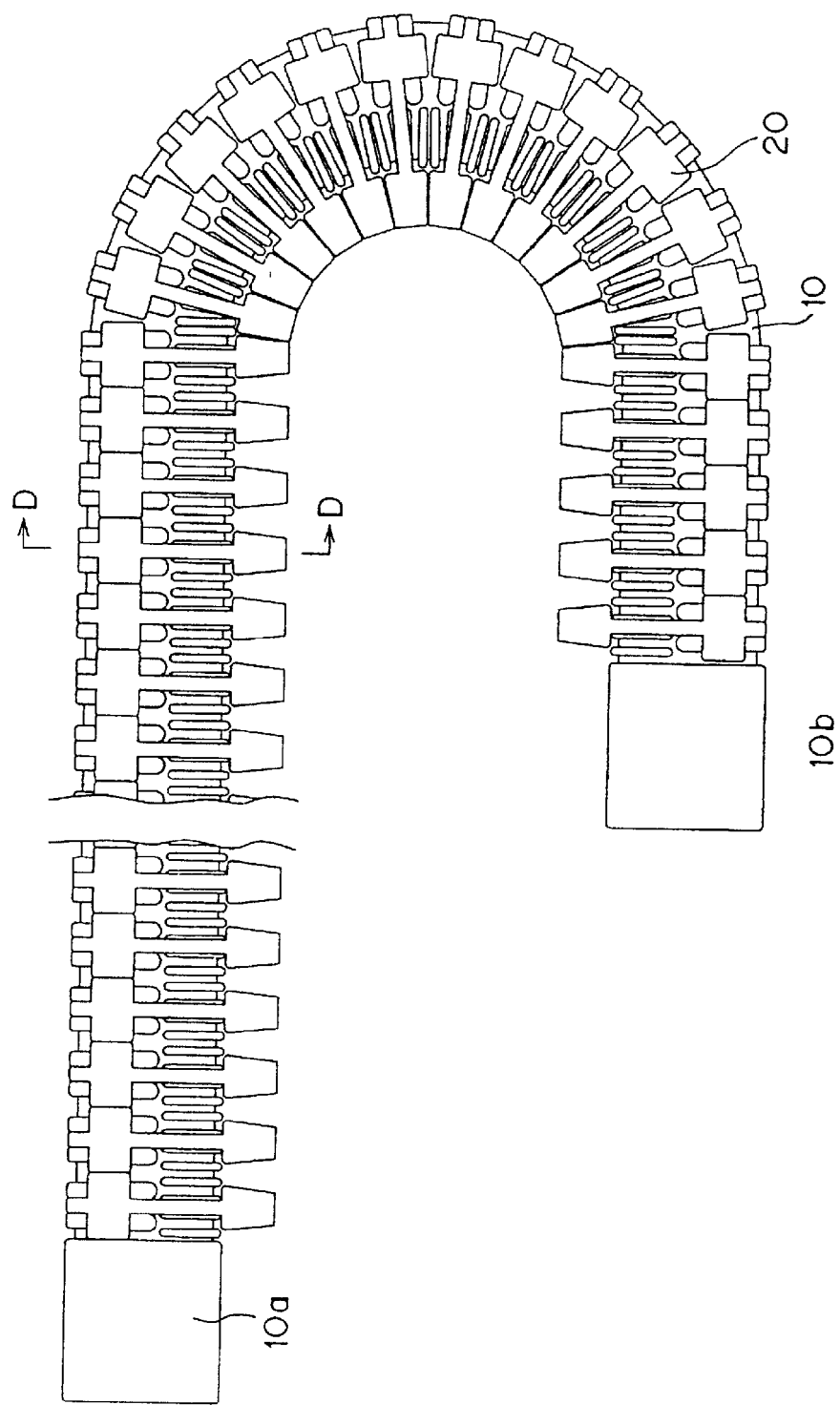
FIG. 8 is a view of an entire protective guide for cables and the like, which is the third Example of the present invention.
Figure 9:
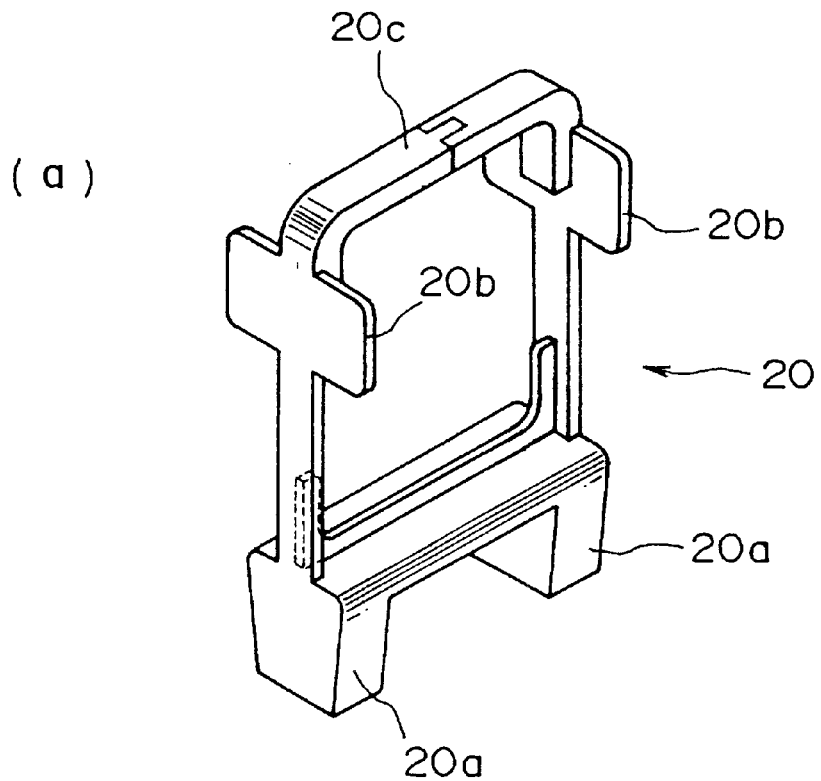
FIG. 9 is a view of a part of a bending-limiting unit used in the third Example of the present invention, particularly, (a) is an entire perspective view thereof and (b) is an enlarged perspective view of an opening/closing portion.
Figure 9:
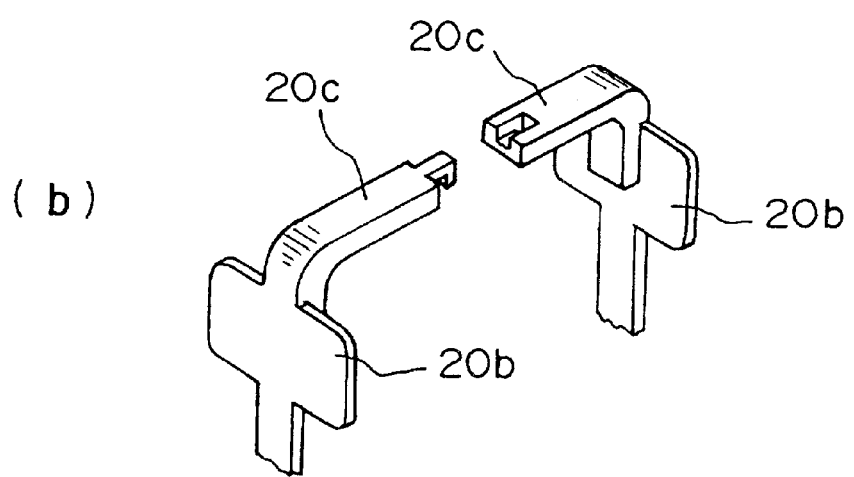
Figure 10:
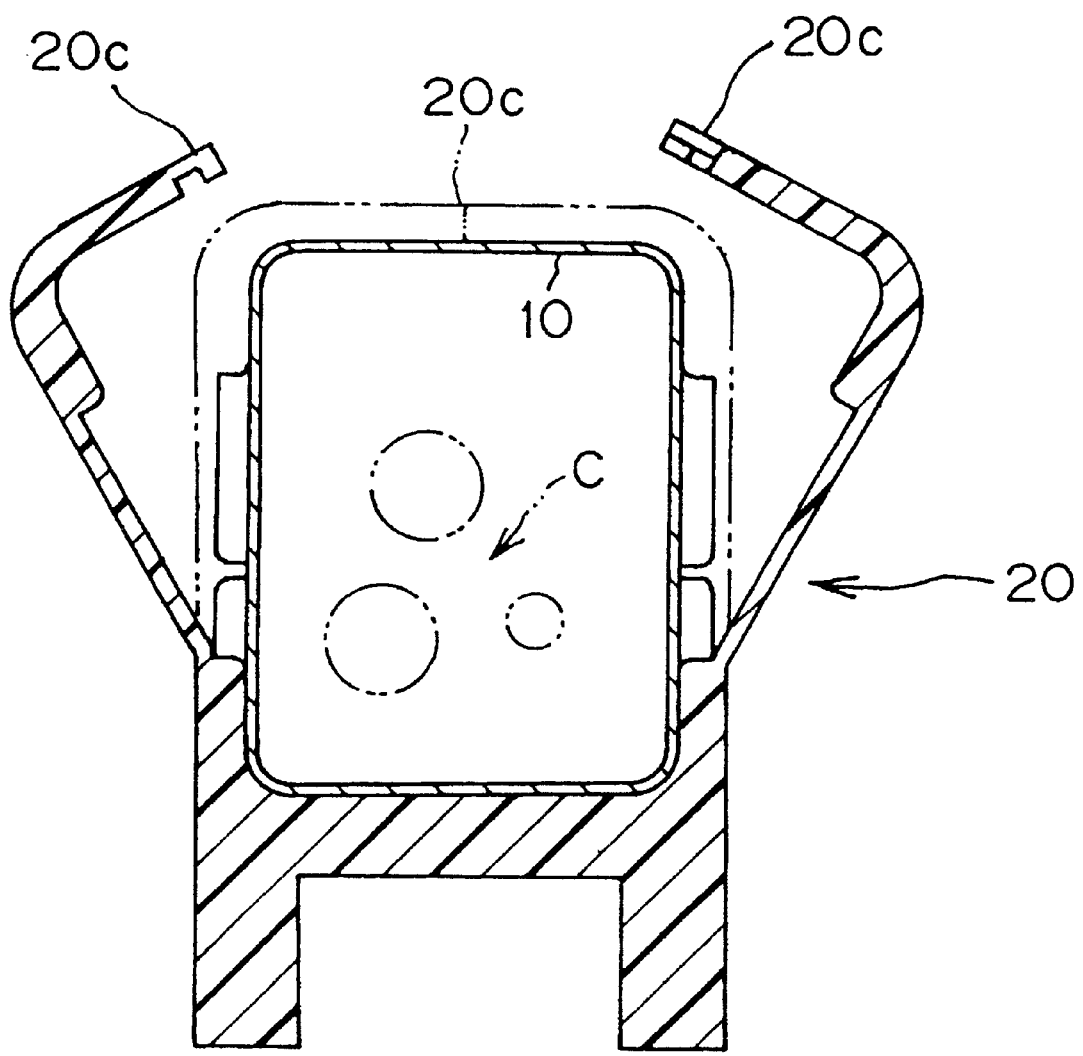
FIG. 10 is a cross-sectional view taken along line D—D of FIG. 8.

Next, a third Example of a protective guide, which is preferable as the present invention, will be described with reference to FIGS. 8 to 10.

The protective guide, that is the third Example of the present invention includes a guide basic structure comprising a synthetic resin flexible tube 10 and synthetic resin bending-limiting units 20 as in the above-mentioned first Example but it is only different from the first Example in that a concrete shape of said synthetic resin bending-limiting units 20 is changed. Thus, the detailed description of concrete structures except for said clip 22 is omitted.

Thus, the concrete shape of the synthetic resin bending-limiting units 20 in the third Example will be described in detail. In the third Example as shown in FIGS. 9(a) and 9(b), the attachment 21 and the clip 22 of the synthetic resin bending-limiting unit 20 in the first and second Examples are integrally resin-molded and an opening/closing portion 20c is provided, which is opened and closed and can be engaged so that a synthetic resin flexible tube 10 is detachably provided on a bend outer peripheral side of the synthetic resin flexible tube 10.

The thus obtained protective guide of the third Example according to the present invention has the same actions and effects as in the protective guide of the first and second Examples. However, in addition to that, in the third Example, since the attachment 21 and the clip 22 forming the synthetic resin bending-limiting unit 20 as in the first and second Examples are integrally resin-molded, and the opening/closing portion 20c is provided, which is opened and closed and can be engaged so that a synthetic resin flexible tube 10 is detachably provided on a bend outer peripheral side of the synthetic resin flexible tube 10. Accordingly, since, as shown in FIG. 10, the opening/closing portion 20c can be opened/closed during maintenance and check as required, a mounting load of the synthetic resin bending-limiting unit 20 on the synthetic resin flexible tube 10 is significantly reduced and the number of parts and production cost can be reduced.

If the feature of the present invention is not lost, it is of course that the present invention is not limited to the above-mentioned Examples. For example, if the synthetic resin flexible tube 10 has a shape in which a plurality of collected cables and the like can be appropriately bend while incorporating them, any shape such as a circular cross-section, an oval cross-section, a rectangular cross-section or the like may be used.

Effects of the Invention

As described above, according to the protective guide for the cables and the like according to claim 1 of the present invention, a flexible tube connected between a movable end portion of the cable and a fixed end portion of the cable and incorporating cables and the like includes a bellows-shaped tubular peripheral wall, and a large number of bending-limiting units surrounded by and fitted onto the bellows-shaped tubular peripheral wall of said flexible tube at a desired interval includes bending-holding portions, which hold a required bending position of said flexible tube while abutting with each other on a bending inner peripheral side, and bending-suppressing portions, which hold a linearly extended position of said flexible tube while abutting with each other on a bending outer peripheral side. Thus, the following specific effects can be obtained.

That is, by the use of a flexible tube the occurrence of contact worn powder between small diameter tubular members, which is likely to occur in an energy conductor holding device including a conventional connecting link structure, can be completely solved. Further, since the cables and the like are completely sealed in the flexible tube to prevent the running out of the cable or the like and can reliably accommodate and protect the cables and the like, discharge of dust and the like such as contact worn powder, which is likely to occur by bending or torsion of the cables and the like C, in the flexible tube, can be completely prevented. Additionally, the cables and the like within the flexible tube 10 can be bending-moved in an stable accommodation protective state without being influenced by polygonal movement of the synthetic resin bending-limiting units. Further, since a large number of bending-limiting unit can be fitted to bellows-shaped tubular peripheral wall at required intervals by including the bellows-shaped tubular peripheral wall in the flexible tube, the large number of bending-limiting unit can be reliably, easily mounted on the flexible tube.

According to the protective guide for the cable and the like according to claim 2 of the present invention, the effects of the protective guide for the cable and the like according to claim 1, can be obtained. Additionally, since said flexible tube and said bending-limiting units are molded of resin, weight reduction and cost reduction in the protective guide can be attained and the occurrence of contact noises and contact worn powder due to bending operation can be further prevented.

According to the protective guide for the cable and the like according to claim 3 of the present invention, the effects of the protective guide for the cable and the like according to claim 1 or 2, can be obtained. Additionally, since the bellows-shaped tubular peripheral wall of said flexible tube includes fine bellows portions formed on said bending inner peripheral side and rough bellows portions formed on said bending outer peripheral side, a smooth bending operation can be attained.

According to the protective guide for the cable and the like according to claims 4 or 6 of the present invention, the effects of the protective guide for the cable and the like according to any one of claims 1 to 3, can be obtained. Additionally, since each of said bending-limiting unit has a frame structure of a rectangular section, a bending holding portion and a bending suppressing portion can be disposed on the both sides of the synthetic resin bending-limiting unit in various configurations so that strength and rigidity required for the protective guide are satisfied. Accordingly, a required bend position and a linearly extended position of the synthetic resin flexible tube can be reliably formed, respectively, and these positions can be smoothly switched mutually without overlapping and restraining them.

According to the protective guide for the cable and the like according to claims 5, 7 and 8 of the present invention, the effects of the protective guide for the cable and the like according to any one of claims 1 to 4, can be obtained. Additionally, since said bending-limiting unit is formed by detachably engaging an attachment disposed on the bending inner peripheral side of said flexible tube and a clip disposed on the bending outer peripheral side of said flexible tube, the flexible tube can be easily removed from the bending-limiting units. As a result the disconnection and arrangement states or the like of the cables and the like can be maintained and checked. Further, by changing a shape of the bending holding portion in the attachment disposed on a bend inner peripheral side of the flexible tube 10, the bending radius of the flexible tube can be optionally set in accordance with the layout of the protective guide.

Description of Reference Numerals

10, Synthetic resin flexible tube
10a, Movable end portion of cables
10b, Fixed end portion of cables
11, Bellows-shaped tubular peripheral wall
11a, Fine bellows portion
11b, Rough bellows portion
20, Synthetic resin bending-limiting unit
20a, Bending holding portion
20b, Bending suppressing portion
20c, Opening/closing portion
21, Attachment
21a, Locking pin
21b, Stopper piece
22, Clip
22a, Pin hole
22b, Rib piece
22c, Contact piece
22d, Cam surface
C, Cables and the like The invention described hereinabove has been set forth by way of example only, and those skilled in the art will understand that many modifications and changes may be made to the invention without departing from the spirit and scope of the CLAIMS which follow hereinbelow.

We claim:

1. A protective guide for cables and hoses, characterized in that a flexible tube connected between a movable end portion of the cable and a fixed end portion of the cable and incorporating cables and hoses includes a bellows_shaped tubular peripheral wall, and that a large number of bending_limiting units surrounded by and fitted onto the bellows_shaped tubular peripheral wall of said flexible tube at desired intervals include bending_holding portions which hold a required bending position of said flexible tube while abutting with each other on a bending inner peripheral side, and bending_suppressing portions, which hold a linearly extended position of said flexible tube while abutting with each other on a bending outer peripheral side.

2. A protective guide for cables and hoses according to claim 1, characterized in that said bending_limiting unit is formed by detachably engaging an attachment disposed on the bending inner peripheral side of said flexible tube and a clip disposed on the bending outer peripheral side of said flexible tube.

3. A protective guide for cables and hoses according to claim 1, characterized in that each of said bending-limiting units has a frame structure and, said frame structure includes a cam.

4. A protective guide for cables and according to claim 1, characterized in that said bending-limiting units include a latching portion which opens and closes permitting installation and fitting of said bending-limiting units on said tube.

5. A protective guide for cables and hoses according to claim 1, characterized in that each of said bending_limiting units has a frame structure of a rectangular section.

6. A protective guide for cables and hoses according to claim 5, characterized in that said bending-limiting units are formed by detachably engaging an attachment disposed on the bending inner peripheral side of said flexible tube and a clip disposed on the bending outer peripheral side of said flexible tube.

7. A protective guide for cables and hoses according to claim 5, characterized in that said bending-limiting units include a latching portion which opens and closes permitting installation and fitting of said bending-limiting units on said tube.

8. A protective guide for cables and hoses according to claim 1, characterized in that the bellows_shaped tubular peripheral wall of said flexible tube includes fine bellows portions formed on said bending inner peripheral side and rough bellows portions formed on said bending outer peripheral side.

9. A protective guide for cables and hoses according to claim 8, characterized in that each of said bending-limiting unit has a frame structure of a rectangular section.

10. A protective guide for cables and hoses according to claim 8, characterized in that said bending-limiting units are formed by detachably engaging an attachment disposed on the bending inner peripheral side of said flexible tube and a clip disposed on the bending outer peripheral side of said flexible tube.

11. A protective guide for cables and according to claim 8, characterized in that each of said bending-limiting units has a frame structure and, said frame structure includes a cam.

12. A protective guide for cables and hoses according to claim 8, characterized in that said bending-limiting units include a latching portion which opens and closes permitting installation and fitting of said bending-limiting units on said tube.

13. A protective guide for cables and hoses according to claim 1, characterized in that said flexible tube and said bending_limiting units are molded of resin.

14. A protective guide for cables and hoses according to claim 13, characterized in that the bellows-shaped tubular peripheral wall of said flexible tube includes fine bellows portions formed on said bending inner peripheral side and rough bellows portions formed on said bending outer peripheral side.

15. A protective guide for cables and hoses according to claim 13, characterized in that each of said bending_limiting units has a frame structure of a rectangular section.

16. A protective guide for cables and hoses according to claim 13, characterized in that said bending_limiting units are formed by detachably engaging an attachment disposed on the bending inner peripheral side of said flexible tube and a clip disposed on the bending outer peripheral side of said flexible tube.

17. A protective guide for cables and hoses according to claim 13, characterized in that each of said bending-limiting units has a frame structure and, said frame structure includes a cam.

18. A protective guide for cables and the hoses according to claim 8, characterized in that said bending-limiting units include a latching portion which opens and closes permitting installation and fitting of said bending-limiting units on said tube.

* * * * *

UNITED STATES PATENT AND TRADEMARK OFFICE
CERTIFICATE OF CORRECTION

PATENT NO.   : 6,573,451 B2
DATED        : June 3, 2003
INVENTOR(S)  : Komiya et al.

It is certified that error appears in the above-identified patent and that said Letters Patent is hereby corrected as shown below:

Column 9,
Lines 41 and 43, delete "bellows_shaped" and insert -- bellows-shaped --.
Lines 42, 52 and 66, delete "bending_limiting" and insert -- bending-limiting --.
Line 45, delete "bending_holding" and insert -- bending-holding --.
Line 48, delete "bending_suppressing" and insert -- bending-suppressing --.

Column 10,
Line 13, delete "bellows_shaped" and insert -- bellows-shaped --.
Line 21, delete "unit has" and insert -- units have --.
Lines 29 and 33, delete "8" and insert -- 13 --.
Lines 40, 48 and 51, delete "bending_limiting" and insert -- bending-limiting --.

Signed and Sealed this

Twenty-eighth Day of October, 2003

JAMES E. ROGAN
*Director of the United States Patent and Trademark Office*